Sept. 19, 1944.　　G. M. REYMOND ET AL　　2,358,535
METHOD OF MAKING BASEBALLS
Filed Nov. 7, 1939

INVENTORS
GUY M. REYMOND
GILBERT H. SWART
BY Evans + McCoy
ATTORNEYS

Patented Sept. 19, 1944

2,358,535

UNITED STATES PATENT OFFICE 2,358,535

METHOD OF MAKING BASEBALLS

Guy M. Reymond and Gilbert H. Swart, Wabash, Ind., assignors to The General Tire & Rubber Company, Akron, Ohio, a corporation of Ohio Application November 7, 1939, Serial No. 303,252

4 Claims. (Cl. 18—55)

This invention relates to a method of making baseballs. It particularly relates to a method of making baseballs which are completely molded from a plastic material.

It is an object of this invention to provide a molded baseball of substantially standard weight, size, and appearance which is comparatively rugged, and which may be produced at relatively low cost.

It is another object of this invention to produce a molded core for a baseball which has the strength and density required for baseball cores.

It is a further object of this invention to provide a completely molded baseball having the core substantially central of the ball.

A baseball to be acceptable should be substantially in dynamic balance, have a definite size, weight, rigidity, and have a sufficiently strong cover and core to withstand the high stresses usually imposed. It has now been found that with the proper combination of materials and with proper method of production, that these requirements may be met in a baseball having a core molded from a single composition and a molded cover.

In the production of baseballs, according to this invention, a core composition of a plastic or moldable nature is prepared by mixing a comparatively light bulk producing material which preferably has resilient properties such as cork, etc., with a flexible binder, which adheres to the bulk producing material and which may be procured in liquefiable form or in the form of a solution and later solidified into a substantially non-plastic substance, and a fibrous reinforcing substance. A measured amount of this homogeneous composition is preferably placed in a preforming mold and preformed without heat into a suitable shape, which is preferably slightly elliptical, so that it can be easily molded in a spherical mold without the entrapment of air or loss of solids of the core composition. The preformed core is then placed into a spherical mold of the correct size and while being held in a spherical shape in the mold the binding material is changed from its initial plastic state to a flexible substantially non-plastic state by vulcanization, polymerization, or the like.

A suitable cover composition which is compatible with the core is prepared in sheet form and cut so as to envelop the entire spherical core with a substantially uniform layer. It is then placed around the core and secured thereto by vulcanizing it in a mold of the desired shape.

The binding material is preferably a rubber or synthetic rubber composition which is inherently flexible and which may be prepared in the form of a cement or liquid and later solidified or vulcanized to substantially eliminate all plastic flow. It should contain suitable compounding ingredients such as sulphur, accelerators, activators, and the like, which may be added at any stage in the preparation of the core forming composition.

The fibrous reinforcing materials may be of vegetable, animal, or of synthetic origin. Even when the fibrous materials are distributed throughout the core composition in a random nature, they have been found to impart the required reinforcement to the core. Small lengths of cord, having a maximum length of about one inch or so, which are obtained by cutting tire friction fabric, etc., into pieces of suitable size, form an excellent reinforcing material and is preferred to even fresh cotton linters, etc., although these may be used if desired.

Any suitable rubber compound which is compatible with the compound of the core may be used for the cover, but it is preferred that the compound of the cover be of a very rapid curing type so that it may be cured at relatively low temperatures and it will be unnecessary to overcure the compound of the core.

In the preparation of the core forming composition the method of mixing is exceptionally important in order that the proper weight, strength, and bulk may be maintained in the core. When the mixing is made by apparatus having two or more rolls which exert pressure on the ingredients, as is the case when a rubber mill is used, the cork or other bulky material has been found to be compressed to such an extent that the composition is not desirable for a baseball core; whereas, when one uses a dough type mixer, such as a Day, a Warner-Pfleiderer, or Baker-Evans mixer having co-acting blades which do not tend to compress materials, such as cork, and reduce their resiliency to such an extent as do rolls, a more suitable composition is readily prepared. If desired, however, the incompressible materials, such as rubber with or without the rubber compounding and vulcanizing ingredients, fibers, etc., may be mixed on a rubber mill, and then mixed with a suitable solvent to produce the rubber binder in liquid form. It may then be mixed with the bulky material in a blade or dough type mixer to produce a core forming composition with desirable properties.

In the preferred process for preparing a core composition having a flexible, substantially nonplastic rubber-like binder, the rubber softener, such as mineral rubber, the fibrous material, the rubber-like binding material, and the compounding reagents, are mixed upon a rubber mill and sheeted to relatively thin sheets so that the rubber is readily dissolved by solvents.

The sheets or strips are then transferred to a suitable mixer, which is preferably of the blade type, where they are swelled by solvents present in sufficient quantity to produce a doughy mass. The mass is then mixed with the bulk producing material or cork to form a homogeneous plastic mixture having the ingredients firmly bonded together. Measured quantities of this composition are then used for molding the baseball cores.

The following examples where the parts are by weight illustrate suitable compositions for the preparation of cores and covers of baseballs:

Example I

A baseball core having exceptionally desirable properties was prepared from the following ingredients:

| | Parts |
|---|---|
| Rubber | 45 |
| Accelerator | |
|   Altax (benzothiazyl disulphide) | 2.3 |
| Litharge or lime | 4.5 |
| Tire friction fabric containing about 40% rubber and cut into pieces having about 1 inch maximum length | 140 |
| Zinc oxide | 5 |
| Antioxidant | |
|   Age-Rite powder (penyl-B naphthalamine) | 1.75 |
| Sulphur | 5.7 |
| Cork which passes through a 5 or 10 mesh screen | 52 |
| Mineral rubber | 27.5 |
| Varnish and paint makers naphtha | 65 |

The rubber, the tire friction fabric which contained the reinforcing fibers, the antioxidant, litharge, and mineral rubber, were mixed together on a rubber mill and sheeted out into relatively thin sheets of $\frac{1}{16}$ or $\frac{1}{8}$ inch thickness. The sheets were then cut into strips and added to a Warner-Pfleiderer mixer which contained a solvent such as varnish or paint makers naphtha in sufficient amounts to produce a doughy mass when thoroughly mixed with the strips of the above composition. The sulphur and zinc oxide were added directly to the rubber dough. The cork was then mixed into the dough and the mixing continued in the mixer for about ten minutes to obtain a pliable mass and to allow the material to firmly bond together.

It has been found that cork, particularly when masticated with rubber compounds or squeezed to any extent give off an acid or other substance which appears to inhibit vulcanization of the composition. A material capable of neutralizing the acids, therefore, should be present in the compound in sufficient quantity to permit vulcanization to readily occur.

In the above example, the litharge or lime was added to neutralize the acid which is present in the cork and thus cause proper vulcanization of the rubber binding material. While other alkaline materials may be used to cause curing of the rubber composition, litharge is particularly effective. It has been used within the range of 3 to 5 parts. The tire friction fabric, which serves as the reinforcing medium to increase the stress resisting power of the core, has been found to be desirable within the range of 120 to 160 parts. This is equivalent to about 75 to about 100 parts of fibrous material and 45 to 60 parts of a rubber composition. The total rubber present in the core composition may amount to about 80 to 110 parts, although the preferred range is between about 85 and about 110 parts. The cork which serves to increase the bulkiness of the core composition has been successfully incorporated within the range of 35 to 75 parts, but 45 to 55 parts are preferred.

The mineral rubber serves as a rubber softener and permits better mixing of the materials with the cork. It is useful within the range of 20 to 30 parts. The quantity of varnish and paint makers naphtha used may vary considerably in accordance with the viscosity desired in the composition, but it has been found that when more than 80 parts or less than 30 parts is present, the composition becomes too thin and too viscous, respectively. Although any rubber solvent may be used in place of the varnish and paint makers naphtha, the solvent used should preferably have a higher boiling point than gasoline in order that evaporation will not occur to an appreciable extent during and immediately after mixing and the doughy mass will be obtained for a longer period of time.

The following example illustrates the cover compound which has been found to be desirable for use with the above core composition:

Example II

| | Parts |
|---|---|
| Rubber (pale crepe) | 100 |
| Di-ortho-tolylguanidine | 0.7 |
| Benzothiazyl disulphide | 0.9 |
| Clay | 46 |
| Titanium dioxide | 13.75 |
| Sulphur | 2.2 |
| Stearic acid | 2 |

These ingredients are mixed in accordance with the method common to the art and are sheeted to the required thickness. They are then preferably cut into suitable form such as that illustrated in Fig. 4, so that they can be wrapped substantially entirely about a spherical core without overlapping. The two accelerators co-act to greatly increase the rate of cure so that the cover may be cured on the core without overcuring it.

The various stages of production of baseballs according to this invention are illustrated in the accompanying drawing, where:

Figure 1:
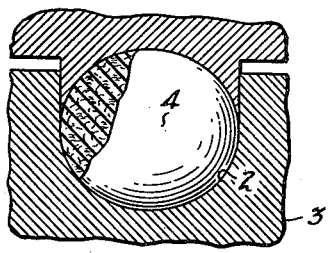
Figure 1 is a sectional view of a preforming mold having a measured amount of the core forming composition therein.
Figure 2:
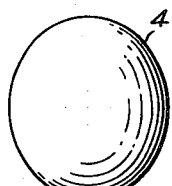
Fig. 2 is an elevational view of the mass of core composition preformed into an elliptical shape in the mold of Fig. 1.
Figure 3:
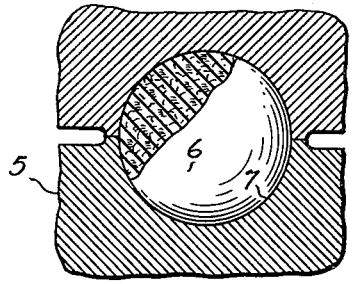
Fig. 3 is a sectional view of the core curing mold and part of the spherical core therein.
Figure 4:
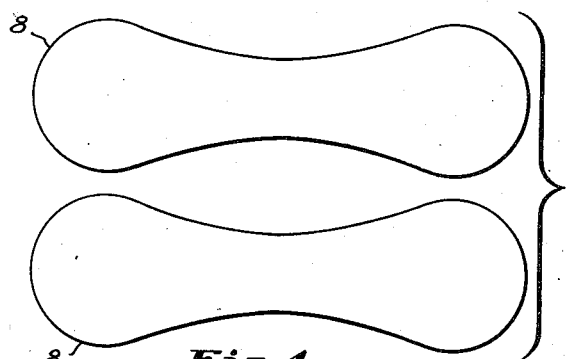
Fig. 4 illustrates a suitable shape for a two-piece cover which can be folded about a spherical core without overlapping.
Figure 5:
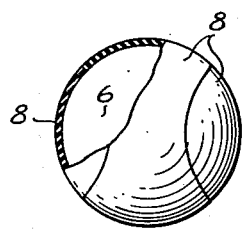
Fig. 5 is an elevational view partly in section of the core having the uncured cover placed thereon.
Figure 6:
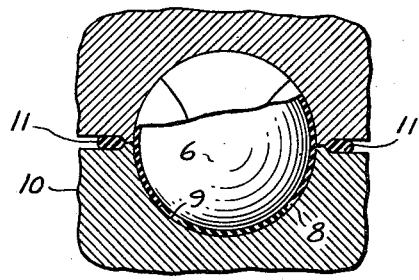
Fig. 6 shows the core, covered with the uncured cover stock, in a suitable cold mold where most of the excess cover material is squeezed out and the ball is reduced to nearly the desired size.
Figure 7:
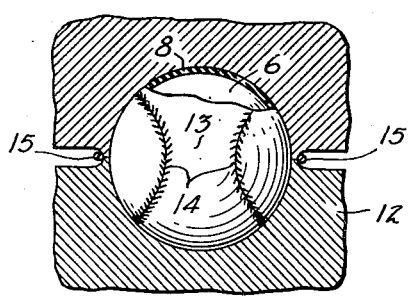
Fig. 7 is an elevational view, partly in section, of a ball in the final vulcanizing mold where it is reduced to exact size and shape and the cover composition vulcanized on the core.
Figure 8:
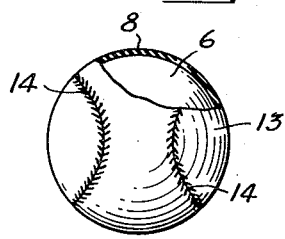
Fig. 8 is an elevational view, partly in section, of a baseball prepared in accordance with this invention.

Referring more particularly to the drawing, a definite weight of core-forming composition such as was prepared in Example I, is placed in the cavity 2 of the cold preforming mold 3 where it is compacted a desired volume having a suitable shape. A preformed mass having an oblong or elliptical contour has been found to be advantageous because the entrapment of air is avoided and there is less tendency for solids to be lost when it is placed in a spherical vulcanizing mold. The preformed core 4 is then incorporated in the spherical cavity 7 of the mold 5 where it is cured to spherical shape to produce a homogeneous spherical core 6. The core 6 is enclosed in the cover 8, which is preferably a rubber compound having desired thickness, color, and properties and which is preferably cut in a suitable shape so that it readily covers the core without overlapping. However, other shapes such as two discs of cover stock may be applied to the ball if desired. The article is then transferred to the cavity 9 of the cold squeeze mold 10, which is well coated with a mold lubricant and where a large proportion of the excess cover composition 11 is removed from the core. A substantially round ball having an uncured cover 8 is then placed in the cavity of the curing mold 12, which is heated to a vulcanizing temperature and where the slight excess of cover composition 15 is squeezed out so that a ball 13 with the required shape and size and with the core 6 centrally disposed therein is produced. The surface configurations 14 made to represent a seam are preferably formed during the final molding step.

The baseballs produced as above described are sufficiently rugged to withstand for a comparatively long period of time the stress normally applied to such articles, even though the reinforcing fibers are distributed in a somewhat random manner rather than in the continuous twisted fashion heretofore used.

Other suitable binding materials such as the synthetic rubbers and materials of a strong non-plastic rubber-like nature, which can be prepared in liquid form, may be substituted for the rubber in the above example, if desired, but rubber is preferred.

Furthermore, it is to be understood that the particular form of product shown and described, and the particular procedure set forth, are presented for the purposes of explanation and illustration and that various modifications of said product and procedure can be made without departing from my invention as defined in the appended claims.

What we claim is:

1. In a process of producing baseball cores wherein a plastic composition containing rubber, comminuted cork, a fibrous material and a solvent is prepared and said plastic composition molded and cured in spherical shape, the steps which comprise incorporating a definite quantity of said composition in a preformed mold, preforming the composition to an ellipsoidal shape, and then incorporating the preformed composition in a substantially spherical mold and vulcanizing it to a spherical shape.

2. A process for producing baseball cores which comprises preparing a plastic composition, comprising 35 to 55 parts of rubber, 35 to 75 parts comminuted cork, 120 to 160 parts of tire friction fabric, litharge, sulphur, and 30 to 80 parts of a suitable solvent, without exerting high rolling pressure on the crok, incorporating a measured quantity of the said composition in a preforming mold, preforming the composition to an ellipsoidal shape, incorporating the preformed composition in a substantially spherical mold, and while the composition is maintained in spherical shape vulcanizing the rubber to reduce its plasticity and firmly bind the ingredients of the core together as a substantially non-plastic mass.

3. A process for producing baseball cores which comprises preparing a plastic composition, comprising 35 to 55 parts of rubber, 35 to 75 parts comminuted cork, 120 to 160 parts of tire friction fabric, lime, sulphur, and 30 to 80 parts of a suitable solvent, without exerting high rolling pressure on the cork, incorporating a measured quantity of the said composition in a preforming mold, preforming the composition to an ellipsoidal shape, incorporating the preformed composition in a substantially spherical mold, and while the composition is maintained in spherical shape vulcanizing the rubber to reduce its plasticity and firmly bind the ingredients of the core together as a substantially non-plastic mass.

4. A process for producing baseball cores which comprises preparing a plastic composition containing about 75 to 100 parts of fibrous material, about 85 to 110 parts of rubber composition, 45 to 55 parts of granulated cork, 3 to 5 parts of litharge, 20 to 30 parts of mineral rubber, and 30 to 80 parts of a rubber solvent derived from petroleum having a higher boiling point than has gasoline, mixing said ingredients without exerting high rolling pressure on the cork, incorporating a measured quantity of the said composition in a preforming mold, preforming the composition to an ellipsoidal shape, incorporating the preformed composition in a substantially spherical mold, and while the composition is maintained in spherical shape vulcanizing the rubber to reduce its plasticity and firmly bind the ingredients of the core together as a substantially non-plastic mass.

GUY M. REYMOND.
GILBERT H. SWART.